Figure 1:
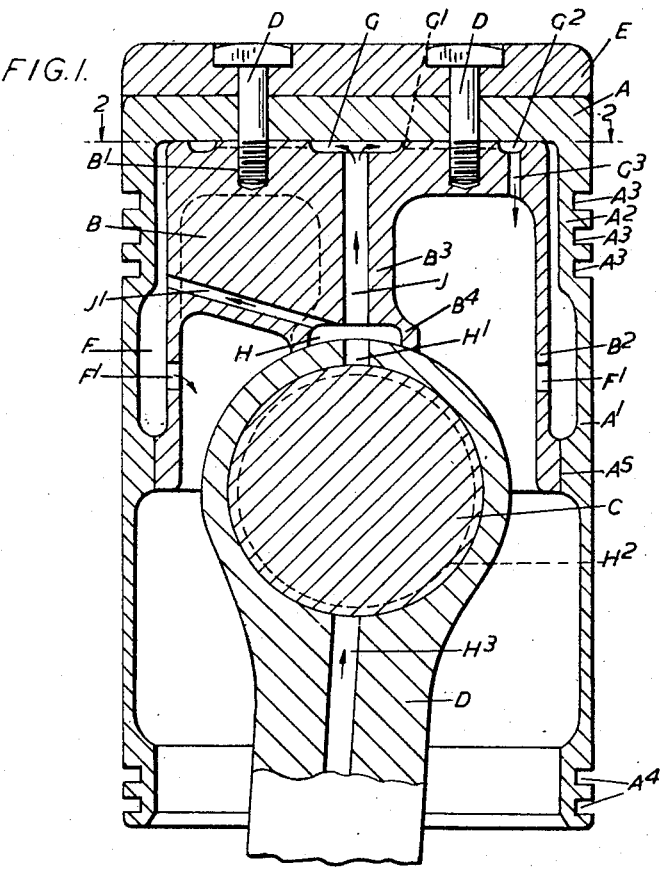

Dec. 19, 1950    E. E. CHATTERTON    2,534,573
PISTON

Filed March 9, 1949    2 Sheets-Sheet 1

Inventor
Ernest E. Chatterton
By Emery, Holcombe & Blair
Attorneys

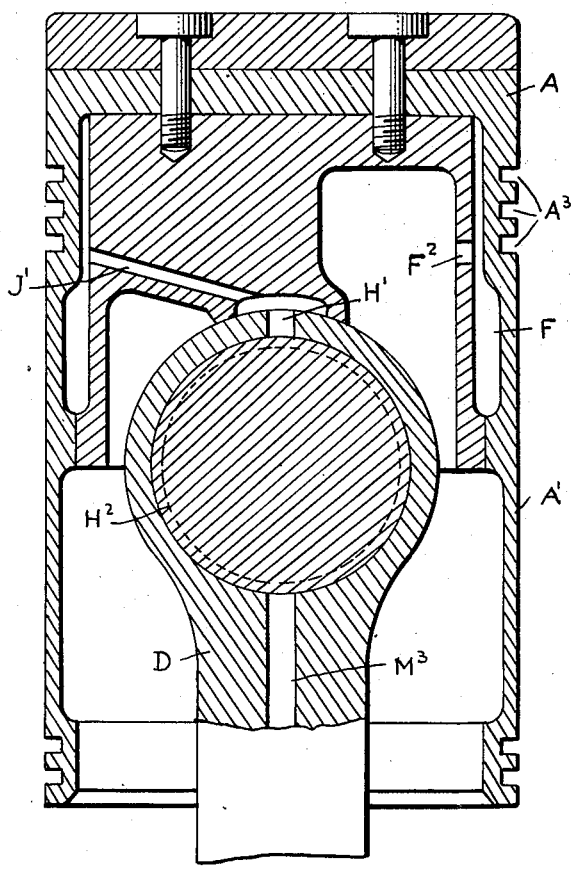

Patented Dec. 19, 1950

2,534,573

UNITED STATES PATENT OFFICE 2,534,573

PISTON

Ernest Edward Chatterton, London, England, assignor to D. Napier & Son Limited, London, England, a company of Great Britain Application March 9, 1949, Serial No. 80,499
In Great Britain March 22, 1948

10 Claims. (Cl. 123—41.38)

This invention relates to pistons of the kind comprising a crown portion of a skirt portion with a ring-carrying portion between them provided with one or more ring grooves, and more particularly to pistons for internal combustion engines designed to operate under high load or other conditions in which the rate of heat flow to the piston tends to be high.

In such engines the limit of output may be determined by the maximum temperature to which the piston can be brought without risk of mechanical failure or without affecting adversely conditions within the combustion chamber or causing the function of the rings to be impaired, as by the rings reaching a temperature at which lubrication between them and the cylinder wall tends to break down or by the formation of excessive carbon in the grooves.

It has been proposed, particularly in pistons for engines of the compression ignition type, to provide for impingement of oil on the undersurface of the piston crown from a jet carried by the connecting rod and to provide for circulation of oil so delivered through a chamber lying beneath the piston crown and extended within the circumferential wall of the piston to a point beyond the ring carrying portion of the piston, the arrangement being such that the chamber is not completely filled with oil at any time so that the oil is shaken from end to end of the chamber during reciprocation of the piston.

The object of the present invention is to provide an improved arrangement particularly suited to engines, such as high performance compression ignition engines, in which the rise in the temperature of the part of the piston carrying the piston rings to a point at which lubrication between the rings and the cylinder breaks down or other troubles occur tends to become a limiting factor.

According to the present invention a piston comprising a crown portion and a skirt portion with a ring carrying portion between them provided with one or more piston ring grooves is formed with a chamber in the piston behind the ring groove or grooves extending towards or into the skirt portion and containing or adapted to have maintained therein a limited quantity of a heat transfer substance such that the substance will be shaken from end to end of the chamber during reciprocation of the piston, the arrangement being such that the heat transfer substance in the chamber is prevented from making contact with any substantial area of the undersurface of the piston crown, and, if this substance is fed to the chamber during operation, it can similarly not make contact with the undersurface of the piston crown before entry into the chamber.

Thus the heat transfer substance in the chamber as it travels from end to end thereof can transfer heat from the ring carrying portion to the skirt portion but cannot receive any appreciable quantity of heat direct from the crown and transfer it to the ring carrying portion. In this way the arrangement tends to improve the cooling of the ring carrying part of the piston and avoids the possibility, present in the prior arrangements, and that the substance which tends to remove heat from the piston as a whole may transfer heat from the centre of the crown to the ring carrying portion and thus tend to increase rather than decrease the temperature of this portion.

In one arrangement according to the invention means are provided for feeding oil into the chamber behind the ring carrying portion during operation of the engine from the connecting rod associated with the piston, and one or more spill orifices are provided in the inner wall of the chamber at such point or points that the ejection of surplus oil therethrough as the body of oil reaches one end or other of the chamber will maintain within the chamber approximately the desired quantity of oil. With such an arrangement the spill orifice or orifices may be arranged so that the surplus oil is ejected therethrough when the piston reaches the end of each outstroke, that is to say each stroke away from the combustion chamber, or when the piston reaches the end of each instroke, or at the end of each outstroke and each instroke.

In any case a separate chamber or series of passages may be provided extending across the undersurface of the piston crown and separately supplied with oil from the connecting rod for the purpose of providing cooling for the piston crown independently of the cooling of the ring carrying portion of the piston.

In an alternative arrangement the chamber behind the ring carrying portion may be completely closed or sealed and contain a predetermined quantity of a heat transfer substance either in a liquid form or in a form which becomes liquid at the working temperature so as to be thrown from end to end of the chamber as the piston reciprocates. Such an arrangement may or may not have separate oil cooling for the piston crown as above described.

Figure 2:
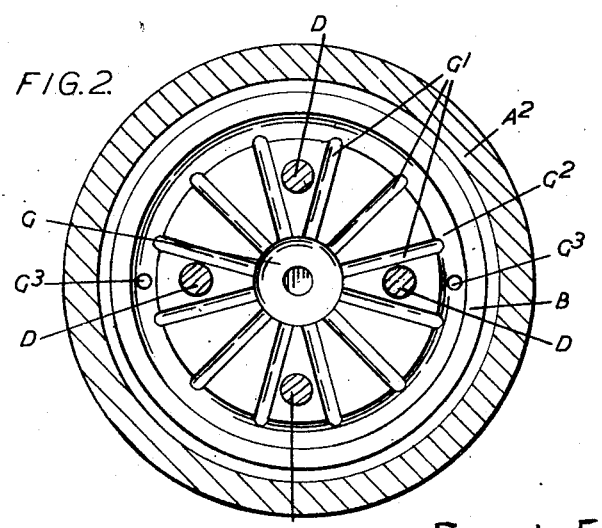

The details of construction of pistons according to the invention may vary but one construction according to the invention is illustrated by way of example in the accompanying drawings, in which Figure 1 is a sectional side elevation in a plane containing the axis of the piston and at right angles to the axis of the gudgeon pin coupling it to the connecting rod;

Figure 2 is a sectional plan in the plane indicated by the line 2—2 in Figure 1; and Figure 3 is a view similar to Figure 1 showing a modified form of the invention.

In the construction illustrated the piston comprises an outer part including a crown portion A and a cylindrical skirt portion $A^1$ connected by a ring-carrying portion $A^2$, and an inner part B disposed within the outer part and provided with gudgeon pin bosses in known manner to receive the ends of a gudgeon pin C by which a connecting rod D is coupled to the inner part B.

The ring-carrying portion $A^2$ is provided with three piston ring grooves $A^3$ of which the most remote from the crown portion may, if desired, contain a scraper ring while the other two contain sealing rings. In addition two grooves $A^4$ are provided in the lower end of the skirt portion $A^1$ to carry further scraper rings.

As shown the crown and ring carrying portions A and $A^2$ are formed of comparatively thick cross section while the skirt portion $A^1$ is considerably thinner except for its lower end portion, where the scraper ring grooves $A^4$ are formed, and for a thickening $A^5$ in the form of an internal circumferential flange.

The inner part B comprises an upper end portion $B^1$, which abuts against the under face of the crown portion A and is secured to it by a number of bolts D and a lower externally cylindrical portion $B^2$ the lower end of which engages the flange $A^5$ in a fluid tight manner. The inner portion B is also provided with an internal projection $B^3$ the lower end of which makes a working fit with the upper surface of the connecting rod D, as indicated at $B^4$, so as to make a substantially fluid tight seal therewith.

The internal dimensions of the skirt portion $A^1$ and of the ring-carrying portion $A^2$ and the external dimensions of the part B are such as to provide, as shown, an annular chamber F between these parts. Further, the upper face of the upper end portion $B^1$ is formed with a central depression forming a chamber G communicating by a series of radial grooves forming passages $G^1$ with an annular groove forming a chamber $G^2$.

A recess constituting a chamber H is formed in the part $B^4$ communicating with a passage $H^1$ in the connecting rod which in turn communicates through a groove $H^2$ in the gudgeon pin with a passage $H^3$ through which oil is fed during operation from the crank shaft of the engine with which the piston is used in known manner.

The recess H communicates through separate passages J and $J^1$ respectively with the chamber G and the chamber F while the chamber $G^2$ communicates with the interior of the piston through two passages $G^3$ and the chamber F communicates with the interior of the piston by way of a number of ports $F^1$ displaced somewhat from its lower end.

The bolts D also serve to secure to the piston crown a plate E formed of a metal having lower heat conductivity than the metal of which the crown A is formed and preferably capable of withstanding, without melting or deterioration, greater temperatures so as both to reduce heat transfer to the crown and to provide a high temperature surface within the combustion chamber of which the piston crown forms a part. Generally the part A of the piston will be formed of aluminum or magnesium alloy while the plate E will be formed of heat resisting steel.

In operation, oil is delivered continuously or in a pulsating manner through the passage $H^3$, the groove $H^2$ and the passage $H^1$ into the chamber H whence it flows by way of the passages J and $J^1$ respectively to the chamber G and into the chamber F.

The oil thus delivered to the chamber G then flows radially outwards through the passages $G^1$ into the chamber $G^2$ from which it escapes through the passages $G^3$ into the interior of the piston and escapes from its lower end.

The oil delivered to the chamber F serves to maintain and renew continuously a quantity of oil in this chamber, which oil is shaken from end to end of the chamber by the reciprocation of the piston, the quantity of oil in the chamber F being maintained substantially constant at all times by the fact that, at the end of each outstroke of the piston, any quantity of oil in excess of that which will just fill the part of the chamber F below the ports $F^1$ will be ejected through such ports.

It will be seen that the radial width of the chamber F is comparatively small behind the ring grooves $A^3$ and wider near its lower end, the dimensions being such that the quantity of oil maintained in the chamber will be such that at the end of each instroke of the piston, when the oil will be thrown to the upper end of the chamber, it will occupy between three quarters and the whole of the narrower upper portion of the chamber. It will also be seen that the arrangement shown is such that the area of the underface of the piston crown with which the oil in the chamber F can make contact is very restricted.

With the construction shown, therefore, the oil which enters the chamber F receives no heat from the piston crown before entering the chamber while moreover, during its occupation of the chamber F, the oil receives little heat from the crown so that it can extract a substantial quantity of heat from the ring-carrying portion $A^2$ of the piston. Heat is, however, separately extracted direct from the piston crown by the oil flowing through the chambers and passages G, $G^1$ and $G^2$.

In a modified arrangement according to the invention, which may be similar in other respects to that illustrated in the drawings, the passage $J^1$ and the ports $F^1$ are omitted and the chamber F is partially filled with a heat transfer liquid or with a solid substance which becomes liquid at the temperature which it attains during operation of the piston. In this case the quantity of heat transfer substance in the chamber F would be for example substantially that which would fill the lower end of the chamber up to the level of the bottom of the ports $F^1$ in the construction actually illustrated, and it will be seen that in this case also the contact between the heat transfer substance and the under surface of the piston crown will be limited to a small area so that the substance will receive little heat direct from the crown and thus be able to transfer a substantial quantity of heat from the ring-carrying portion $A^2$ to the cooler skirt portion A¹ which will be loosing heat continuously to the cylinder walls.

In a still further modification according to the invention, similar in other respects to the construction shown in Figures 1 and 2, the passage J and the depression G and grooves G¹G² may be omitted, as shown in Figure 3 and, instead of ports F¹ disposed near the lower end of the chamber F, similar ports F² may be arranged nearer to the upper end thereof and substantially opposite the part of the piston carrying the piston ring grooves A³. Thus in such an arrangement all the oil flowing from the port H¹ will flow into the annular chamber F by way of the passage J¹ and surplus oil will be ejected through the ports F² at the end of each in-stroke of the piston in an upward direction and will impinge on the part of the member B immediately below the piston crown. The oil will thus primarily cool the ring-carrying portion A² but will subsequently tend to extract heat more directly from the crown.

In every case it is a feature of the invention that the heat transfer substance which is shaken from end to end of the chamber behind the ring grooves receives little or no heat direct from the piston crown.

What I claim as my invention and desire to secure by Letters Patent is:

1. A piston comprising a crown portion, a skirt portion, and a ring-carrying portion situated between the crown and skirt portions and provided with at least one piston ring groove, said piston having an annular chamber formed in the ring-carrying portion behind the piston ring grooves and extending towards the crown portion and skirt portion, this chamber being adapted to contain and have maintained therein a limited quantity of heat transfer substance which will be shaken from end to end thereof during reciprocation of the piston, both ends of the chamber being completely closed and the upper end comprising a narrow annular strip of the under surface of the contiguous crown portion.

2. A piston and connecting rod assembly comprising a piston having a crown portion, a skirt portion, and a ring-carrying portion between the crown and skirt portions and provided with at least one piston ring groove, an annular chamber being provided in the piston behind the ring groove and extending towards the skirt portion, the lower and upper ends of this chamber being closed while at least one discharge opening is situated in the inner circumferential wall of the chamber at a point displaced from both ends and lying nearer to one end than to the other, a gudgeon pin mounted in the piston, a connecting rod having a small end surrounding the gudgeon pin and provided with a passage through which oil can be fed to such small end of the connecting rod, a part of the circumference of the small end of the connecting rod making a substantially fluid-tight seal with a part of the piston, and a port in said part of the small end of the connecting rod communicating with the oil passage in the connecting rod and also with an oil passage in the piston leading to the annular chamber therein.

3. A piston and connecting rod assembly as claimed in claim 2, in which the discharge opening from the annular chamber is situated adjacent to the end thereof remote from the piston head.

4. A piston and connecting rod assembly as claimed in claim 3, in which the annular chamber is formed between an outer circumferential wall constituted by the skirt and ring-carrying parts of the piston and an inner circumferential wall constituted by a separate insert which carries the gudgeon pin, the inner end of this insert engaging the under surface of the piston crown and forming therewith a series of passages extending across the under surface of the piston crown, the insert being provided with separate passages by which oil is fed respectively to the annular chamber and to the passages extending across the under surface of the piston crown.

5. A piston as claimed in claim 1, in which the annular chamber is completely closed and is partially filled with a heat transfer substance which is liquid at the normal working temperature of the piston.

6. A piston as claimed in claim 1, in which the radial dimension of the part of the annular chamber which lies immediately behind the piston ring grooves is smaller than that of the part of the annular chamber which lies within the skirt portion of the piston.

7. A piston and connecting rod assembly as claimed in claim 2, in which the radial dimension of the part of the annular chamber lying immediately behind the piston ring grooves is smaller than that of the part of the chamber lying within the skirt portion of the piston.

8. A piston comprising a head portion, a skirt portion, and a ring-carrying portion lying between the head and skirt portions and having at least one piston ring groove formed therein, an annular chamber being formed within the ring-carrying portion with closed ends and at least one discharge opening in its inner wall adjacent to but displaced from the end of the chamber remote from the crown, with means for delivering oil directly from a connecting rod through a passage within the piston into the annular chamber wherein the end of the chamber adjacent to the crown is closed and has a radial dimension which is not more than one-twentieth of its external diameter.

9. A piston as claimed in claim 1, in which the end of the annular chamber adjacent to the piston crown has a radial dimension which is not more than one-twentieth of its external diameter.

10. A piston and connecting rod assembly as claimed in claim 2, in which the end of the annular chamber adjacent to the piston crown has a radial dimension which is not more than one-twentieth of its external diameter.

ERNEST EDWARD CHATTERTON.

REFERENCES CITED

The following references are of record in the file of this patent:

UNITED STATES PATENTS

| Number | Name | Date |
|---|---|---|
| 1,779,555 | Minnick | Oct. 28, 1930 |
| 2,159,989 | Hazen et al. | May 30, 1939 |
| 2,362,158 | Ricardo | Nov. 7, 1944 |
| 2,407,429 | Kuttner | Sept. 10, 1946 |